(12) United States Patent
Devane (10) Patent No.: US 7,885,792 B2
(45) Date of Patent: Feb. 8, 2011

(54) PROGRAMMING ENVIRONMENT

(75) Inventor: Charles J. Devane, Upton, MA (US)

(73) Assignee: The MathWorks, Inc., Natick, MA (US)

(*) Notice: Subject to any disclaimer, the term of this patent is extended or adjusted under 35 U.S.C. 154(b) by 748 days.

(21) Appl. No.: 10/414,260

(22) Filed: Apr. 15, 2003

(65) Prior Publication Data

US 2004/0210615 A1   Oct. 21, 2004

(51) Int. Cl.
G06F 7/60 (2006.01)
G06F 17/50 (2006.01)
G06G 7/48 (2006.01)
G06F 9/44 (2006.01)
G06F 9/45 (2006.01)

(52) U.S. Cl. ............... 703/2; 703/6; 703/13; 717/104; 717/106; 717/114; 717/136

(58) Field of Classification Search ............ 703/22, 703/2, 6, 13; 717/104, 106, 114, 136
See application file for complete search history.

(56) References Cited

U.S. PATENT DOCUMENTS

| | | | | |
|---|---|---|---|---|
| 5,265,254 | A * | 11/1993 | Blasciak et al. | 717/130 |
| 5,528,516 | A * | 6/1996 | Yemini et al. | 702/181 |
| 6,314,562 | B1 * | 11/2001 | Biggerstaff | 717/156 |
| 6,584,601 | B1 * | 6/2003 | Kodosky et al. | 716/4 |
| 6,665,864 | B1 * | 12/2003 | Kawahito et al. | 717/151 |
| 6,802,053 | B1 * | 10/2004 | Dye et al. | 717/113 |
| 6,868,526 | B2 * | 3/2005 | Singh | 715/763 |
| 6,885,983 | B1 * | 4/2005 | Ho et al. | 703/14 |
| 2002/0095660 | A1 * | 7/2002 | O'Brien et al. | 717/127 |

OTHER PUBLICATIONS

The Mathworks Inc., "Simulink: Dynamic System Simulation for Matlab" Ver. 3, 1999, 55 pgs.*
J.R. White, "System Dynamics: V. Modeling and Simulating Dynamic Systems with Matlab", 1999, 5 pgs.*
Ancourt et al., "Array Resizing for Scientific Code Debugging, Maintenance and Reuse", ACM, 2001, pp. 32-37.*
Gilbert et al., "Sparse Matrices in Matlab: Design and Implementation", 1992, pp. 1-24.*
The Mathworks Inc., "Simulink: Dynamic System Simulation for Matlab" Ver. 3, 1999, Chapters 1-2, 30 pgs.*
Nist, "Jama: Java Matrix Package", updated 2005, http://math.nist.gov/javanumerics/java, 2 pages.*
The Mathworks Inc., "Simulink: Dynamic System Simulation for Matlab" Ver. 3, 1999, Chapter 3, 80 pgs.*
The Mathworks, Inc. "Simulink Writing S-Functions" 1998, 210 pages.*

(Continued)

Primary Examiner—Hugh Jones
Assistant Examiner—Suzanne Lo
(74) Attorney, Agent, or Firm—Nelson Mullins Riley & Scarborough LLP; Kevin J. Canning (57) ABSTRACT

A method includes combining functionality from a matrix language programming environment, a statechart programming environment and a block diagram programming environment into an integrated programming environment. The method can also include generating computer instructions from the integrated programming environment in a single user action. The integrated programming environment can support fixed-point arithmetic.

114 Claims, 3 Drawing Sheets

OTHER PUBLICATIONS

Tiwari, "Formal Semantics and Analysis methods for Simulink Stateflow Models", Technical report, SRI International, 2002.*

The MathWorks, Inc., "Real-Time Workshop, for Use with SIMULINK, User's Guilde, Version 3," The MathWorks, Inc., (1999).

The MathWorks, Inc., "SIMULINK, Dynamic System Simulation for Matlab, Using Simulink, Version 3," The MathWorks, Inc. (1999).

The MathWorks, Inc., "Stateflow, for Use with SIMULINK, User's Guide, Version 2," The MathWorks, Inc. (1999).

National Instruments, "LabVIEW™ User Manual," Part No. 320999E-01 (2003).

Simulink, "Version 6.0 (R14) Simulink Software," The MathWorks, Inc. retrieved online at http://www.mathworks.com/access/helpdesk/help/toolbox/simulink/rn/bqmg7gf-1.html (2009).

* cited by examiner

PROGRAMMING ENVIRONMENT

REFERENCE TO RELATED APPLICATIONS

This application relates to U.S. Ser. No. 10/414,250 entitled "PROGRAMMING LANGUAGE TYPE SYSTEM WITH AUTOMATIC CONVERSIONS", filed Apr. 15, 2003 and is incorporated in its entirety herein.

TECHNICAL FIELD

This invention relates to a programming environment.

BACKGROUND

Developers use programming environments to design systems.

Matrix language environments are generally used for modeling systems that are predominantly characterized by numeric-intensive computations such as matrix operations from linear algebra.

Statechart environments are used for modeling systems predominantly characterized by complex modes, or states, particularly when combined with flow diagrams for describing control flow between states.

Block diagram environments are generally used for modeling systems predominantly characterized by complex signal flow.

SUMMARY

In one aspect the invention features a method that includes integrating functionality from a matrix language programming environment, a statechart programming environment and a block diagram programming environment into an integrated programming environment.

In another aspect, the invention features an article that includes a machine-readable medium that stores executable instructions. The instructions cause a machine to integrate functionality from a matrix language programming environment, a statechart programming environment and a block diagram programming environment into an integrated programming environment.

In a further aspect, the invention features an apparatus that includes a memory that stores executable instructions and a processor. The processor executes the instructions to integrate functionality from a matrix language programming environment, a statechart programming environment and a block diagram programming environment into an integrated programming environment.

One or more of the following features can be included. The integrated programming environment can support fixed-point arithmetic. The integrated environment can support matrix data types and matrix operations as first class language features. The matrix operations can be matrix multiplication, matrix transposition, matrix complex conjugate transposition, matrix power, matrix right division, matrix left division, matrix factorization, matrix decomposition, and/or matrix inversion. The integrated programming environment can be a standalone programming language.

Additional features can include enabling a user to specify scaling of fixed-point operations. Still other features can include generating computer instructions from the integrated programming environment in a single user action. Generating computer instructions can include generating computer instructions for an embedded processor. Generating computer instructions can also include generating computer instructions for synthesizing hardware. Generating computer instructions can also include translating the matrix language representation, the block diagram representation, and the statechart representation into a common representation from which the computer instructions are generated. Integrating can include integrating a matrix language programming environment into a block diagram programming environment. Integrating can also include combining the matrix language programming environment into a statechart programming environment.

Other features include collecting data automatically on a behavior of a system modeled with the integrated programming environment. The automatically collected data may include collected data on values of variables. The automatically collected data may also include collected data on values of signals.

The automatically collected data may include minimum and maximum values, statistical distribution of values, the sequence of values, configuration of states, testing of transitions, execution of transitions, states entered, states exited, transitions tested, transitions executed, a sequence of entering states, a sequence of exiting states, a sequence of testing transitions, a sequence of executing transitions, Boolean expressions satisfying condition coverage, Boolean expressions satisfying modified condition decision coverage.

Collecting data may include collecting data during simulation of the modeled system, during execution of instrumented code in an embedded system and/or during operation of instrumented hardware.

Other features of data collection include using the automatically collected data for selecting data types. The selected data types may include fixed-point data types. The data types may be selected automatically in a single user action.

Still other features include using the automatically collected data to measure the completeness of testing. To measure completeness includes determining components executed and determining components not executed; determining states entered, states exited, transitions tested, and transitions executed; determining values taken by variables and determining values taken by signals; and determining Boolean expressions satisfying condition coverage and determining Boolean expressions satisfying modified condition decision coverage.

Other features include using the automatically collected data for verifying the functional behavior of a modeled system. Verifying may include verifying values, verifying minimum and maximum values, verifying a statistical distribution of values, verifying the sequence of values, verifying the configuration of states, verifying the testing of transitions, verifying the execution of transitions, verifying states entered, verifying states exited, verifying transitions tested, verifying transitions executed, verifying a sequence of entering states, verifying a sequence of exiting states, verifying a sequence of testing transitions, verifying a sequence of executing transitions.

Another feature includes using the automatically collected data to optimize the modeled system. To optimize the modeled system may include removing zero checks for division, removing negative checks for square root calculations, removing range checks for array indexing, removing overflow and underflow checks, removing absolute value calculations, and simplifying absolute value computations.

In another aspect the invention features a method that includes supporting fixed-point arithmetic in a matrix language programming environment.

In a further aspect the invention features an article that includes a machine-readable medium that stores executable instructions. The instructions cause a machine to support fixed-point arithmetic in a matrix language programming environment.

In a still further aspect the invention features an apparatus that includes a memory that stores executable instructions; and a processor that executes the instructions to support fixed-point arithmetic in a matrix language programming environment.

In another aspect the invention features a method that includes generating computer instructions for an embedded system from the matrix language programming environment in a single user action.

In a further aspect the invention features an article that includes a machine-readable medium that stores executable instructions. The instructions cause a machine to generate computer instructions for an embedded system from the matrix language programming environment in a single user action.

In a still further aspect the invention is an apparatus that includes a memory that stores executable instructions; and a processor that executes the instructions to generate computer instructions for an embedded system from the matrix language programming environment in a single user action.

One or more of the aspects above can have one or more of the following advantages. By combining a statechart, matrix language and block diagram functionality into one integrated programming environment, design productivity is increased by eliminating inefficiencies from going from one programming environment to another programming environment. In addition, by generating code automatically, there is no need to have a software developer write the code to implement the design, or to have a hardware developer design circuits to implement the design. Furthermore, by implementing fixed-point functionality, a programming environment can be used in systems where small processing time or low power consumption is required.

DESCRIPTION

Figure 1:
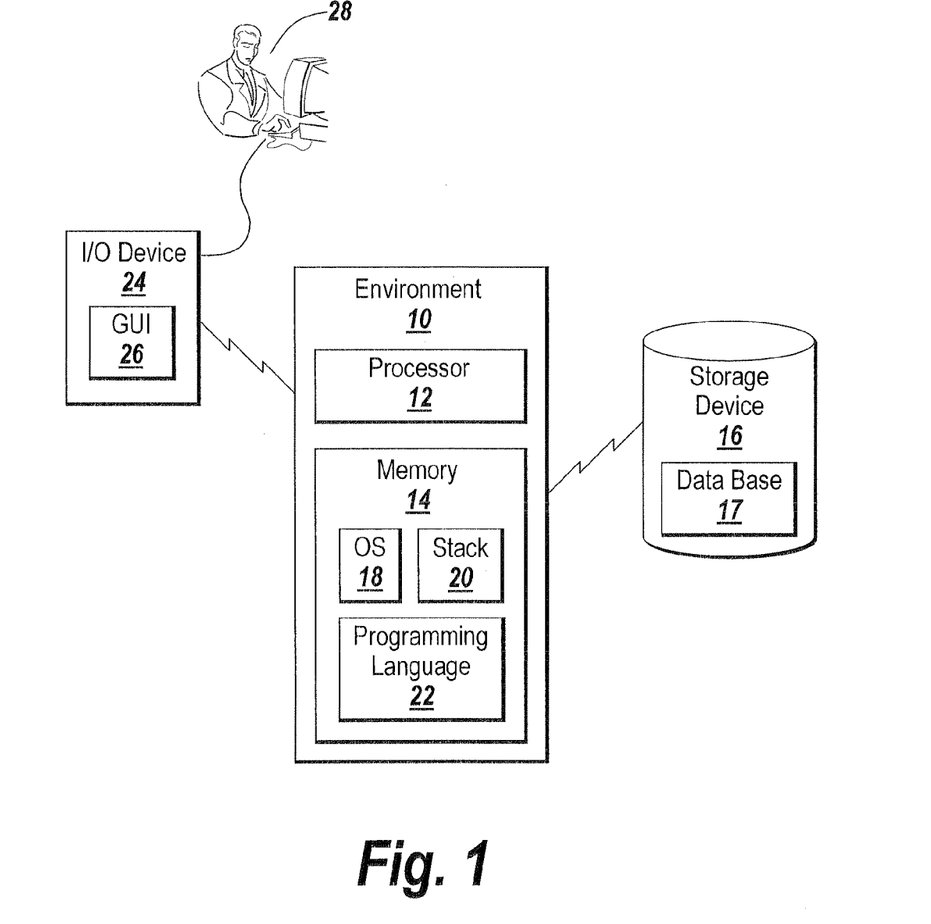
FIG. 1 is a block diagram of a programming environment system.

Referring to FIG. 1, a programming environment system 10 includes a processor 12, memory 14, and a storage device 16. Memory 14 includes an operating system (OS) 18, such as Linux, UNIX or Microsoft Windows XP, a TCP/IP stack 20 for communicating with a network (not shown), and a programming language 22. Storage device 16 contains a database 17 that contains representations (not shown) for matrix language, statechart, and block diagrams. Program environment system 10 also includes a link to an input/output (I/O) device 24 for display of a graphical user interface (GUI) 26 to a user 28.

System 10 receives block diagram representations, matrix language representations and statechart representations generated by user 28 and stores them in database 17. During a code generation process, these representations are translated to a common representation depending on an environment chosen by user 28.

Figure 2:
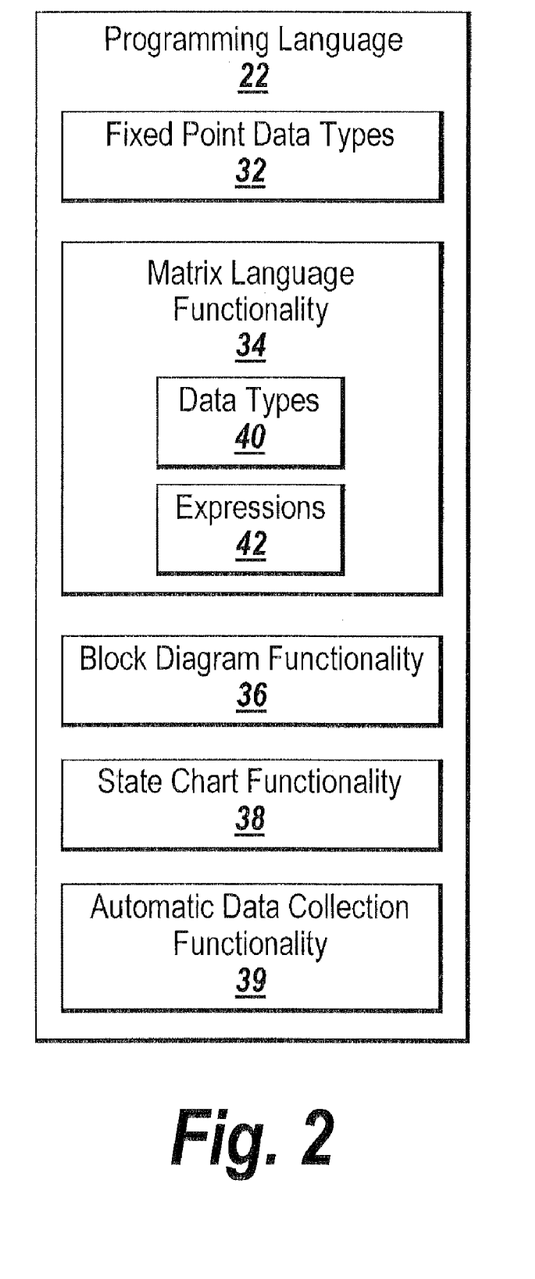
FIG. 2 is a block diagram of a programming language of FIG. 1.

Referring to FIG. 2, programming language 22 includes fixed-point data types 32, matrix language functionality 34, block diagram functionality 36, statechart functionality 38 and an automatic data collection functionality 39. Matrix language functionality 34 includes matrix language data types 40 and matrix language expressions 42.

The simplest fixed-point types 32 are specified by a number of bits in the stored integer; whether the stored integer is signed or unsigned; and a power-of-two scaling factor, which can be represented as a factor itself (e.g., 0.125) or an exponent of two (e.g., −3), or a number of fractional bits (e.g., 3).

More complex fixed-point types 32 can have a scaling factor that is not a power of two, or a bias. These features complicate the arithmetic, so they are generally used only when necessary.

A feature of matrix language functionality 34 is support for matrices and matrix operations. This is reflected in data types 40 and expressions 42.

Programming language 22 uses homogeneous arithmetic, that is, all arithmetic is performed using one of the data types 40. In particular, the data type can be double precision floating point, single precision floating point and signed 16- or 32-bit fixed-point, with user-specified number of fraction bits. Other data types 40 can be used, for example, unsigned fixed-point, fixed-point with more complex scaling, signed and unsigned integers of various sizes.

The type of arithmetic is specified using a function do_math_as( ). For example, do_math_as('double') is for double precision floating point; do_math_as('single') is for single precision floating point; do_math_as('sfix', 32, 30) is used for signed 32-bit fixed-point with 30 fraction bits, do_math_as('sfix', 16, 8) is used for signed 16-bit fixed-point with 8 fraction bits.

Variables are dynamically typed, that is, they take on the type of the last value assigned to them. Variables usually have the do_math_as( ) type, but other types are permitted also. This is useful to minimize storage requirements for applications that process large volumes of data. Type cast operations are provided to convert values to a storage type for assignment. For example, x=double(foo) converts an expression "foo" to double-precision and stores it; x=single(foo) converts the expression "foe" to single-precision and stores it; and x=sfix(32, 30, foo) converts the expression "foo" to signed 32-bit fixed-point with 30 fraction bits and stores it.

All values are converted to the do_math_asotype, if necessary, before being used in arithmetic.

Other examples of homogeneous arithmetic use various data types 40, where each kind of operation is always performed with the same data type, but different operations can use different data types. One example using more than one fixed-point data types uses a "word"-sized data type for assignment, a larger "accumulator"-sized data type for addition, and a still larger "multiplier"-sized data type for multiplication.

In other examples, a heterogeneous arithmetic is performed using various data types 40, where each kind of operation can be performed with various data types. Such examples define the usual set of type propagation rules to decide the data type for each operation in an expression.

In still another example static typing, in which a given variable must retain the same type throughout the program, is used. Such an example defines the usual declaration syntax to specify a data type for each variable. (see U.S. Ser. No. 10/414,250, entitled "PROGRAMMING LANGUAGE TYPE SYSTEM WITH AUTOMATIC CONVERSIONS", filed Apr. 15, 2003).

When the matrix language is used within another environment, such as a block diagram programming environment or a statechart programming environment, other methods of specifying types are provided. For example, a block diagram programming environment can specify the do_math_asotype as a property of the diagram, using the environment's process of specifying properties. The types of input and output variables can be inherited from the input and output connections in the block diagram.

Below are expressions 42 for matrix language functionality 34 in programming language 22.

| Expr | | |
|---|---|---|
| | Number | Real numbers |
| | Pi | 3.141592654 |
| | Inf | Infinity |
| | Nan | Not-a-number |
| | Id | Variable names |
| | expr binop expr | Binary operators |
| | preop expr | Prefix unary operators |
| | expr postop | Postfix unary operators |
| | expr:expr | Range operator |
| | expr:expr:expr | Range operator with increment |
| | (expr) | Grouping |
| | expr (index-list) | Matrix indexing |
| Index-list | expr | List of matrix indices |
| | expr, index-list | |
| Binop | + | Element-wise addition |
| | − | Element-wise subtraction |
| | .* | Element-wise multiplication |
| | ./ | Element-wise right division |
| | .\ | Element-wise left division |
| | .^ | Element-wise power |
| | < | Element-wise less then |
| | <= | Element-wise less than or equal |
| | > | Element-wise greater than |
| | >= | Element-wise greater than or equal |
| | == | Element-wise equal |
| | ~= | Element-wise not equal |
| | & | Element-wise logical AND |
| | \| | Element-wise logical OR |
| | * | Matrix multiplication |
| | / | Matrix right division |
| | \ | Matrix left division |
| | ^ | Matrix power |
| preop | − | Element-wise negation |
| | ~ | Element-wise logical NOT |
| postop | .' | Matrix transpose |
| | ' | Matrix complex conjugate transpose |

The element-wise operators apply the operation to the inputs, element by element. The operands of element-wise binary operators have the same dimensions. The output of an element-wise operation has the same dimensions as the input.

The matrix operations, except division, follow the ordinary definitions from linear algebra. Matrix division is used to find the solution to matrix equations. For example, X=A\B denotes the solution to the matrix equation AX=B; and X=B/A denotes the solution to the matrix equation XA=B.

Block diagram functionality 36 is a result of using the matrix language within a block diagram environment with a special matrix language block. The appearance and behavior of the block (e.g., with respect to attaching inputs and outputs) is similar to other blocks in the environment, except that its computational behavior is determined by a matrix language program associated with the block. The matrix language program text is directly associated with the block (i.e., not stored in a separate file). Double-clicking on the block using I/o device 24 (e.g., a mouse) opens a new window for editing the matrix language in GUI 26. Another example can edit the program directly on the diagram. An additional example associates a file path to the program for the block. In this case, the program can be edited as described above, or an ordinary text editor is used outside the block.

Programming language 22 chooses the do_math_asotype as a property of the block, using the environment's process of specifying properties for block properties. The type can be specified directly, or by giving the name of a type defined elsewhere in the environment. The latter enables the types of many blocks to be changed in a single place. The types of variables can be specified likewise. The types of input and output variables can also be specified by inheritance from input/output connections.

Statechart functionality 38 is a result of using the matrix language within a statechart environment by associating actions, written in the matrix language, with states and transitions. For example, an action can be executed when a transition is tested (particularly useful for statecharts incorporating flow diagrams); a transition is taken; a state is entered; a state is exited; and so forth.

For statechart programming environments that incorporate functions, the body of a function can be specified using the matrix programming language, just as discussed above for block diagram programming environments.

Programming language 22 chooses the do_math_as( ) type as a property of the statechart, using the customary GUI affordances for chart properties. The type can be specified directly, or by giving the name of a type defined elsewhere in the environment. The latter enables the types of many charts to be changed in just a single place. The types of variables can be specified likewise. The types of input and output variables can also be specified by inheritance from input/output connections.

Automatic data collection functionality 39 collects data about system behavior. The collected data may include the values of variables and the values of signals. The collected data may include, the minimum and maximum values of variables and signals, the statistical distribution of values of variables and signals, and sequences of values of variables and signals.

The collected data may further include a configuration of states, a testing of transitions, an execution of transitions, a determination of the states entered or exited, a determination of the transitions tested, a determination of the transitions executed, the sequence of entering or exiting states, the sequence of testing transitions, and the sequence of executing transitions.

Automatic data collection functionality 39 collects data during one or more of the times: during simulation of a modeled system; execution of instrumented code running in an embedded system; and during operation of instrumented hardware.

The collected data may be used to select data types. including selecting fixed-point data types.

The collected data may also be used for measuring the completeness of testing. For example, completeness may be measured by how many, and which, elements of the system have been executed or not, how many, and which, states have been entered or exited, how many, and which, transitions have been tested, and/or how many, and which, transitions have been executed.

Completeness may also be measured by what ranges of values a variable or signal has taken on, for example, whether a given variable has taken on a zero value, a negative value, or values close to some breakpoint.

The collected data may also be used for functional verification of the design, by determining whether the collected data is consistent with correct behavior of the system.

The collected data may further be used for optimizing the design. For example, if the input to an absolute value calculation is never negative, the calculation may be removed. In another example, if the input is never positive, the calculation may be replaced by a simple negation.

For another example, division operations ordinarily check to be sure the denominator is not zero. But if the collected data shows the denominator is never zero, the check may be removed. Other operations having similar checks that might be removed include square root, array indexing and any operation that might overflow or underflow.

Figure 3:
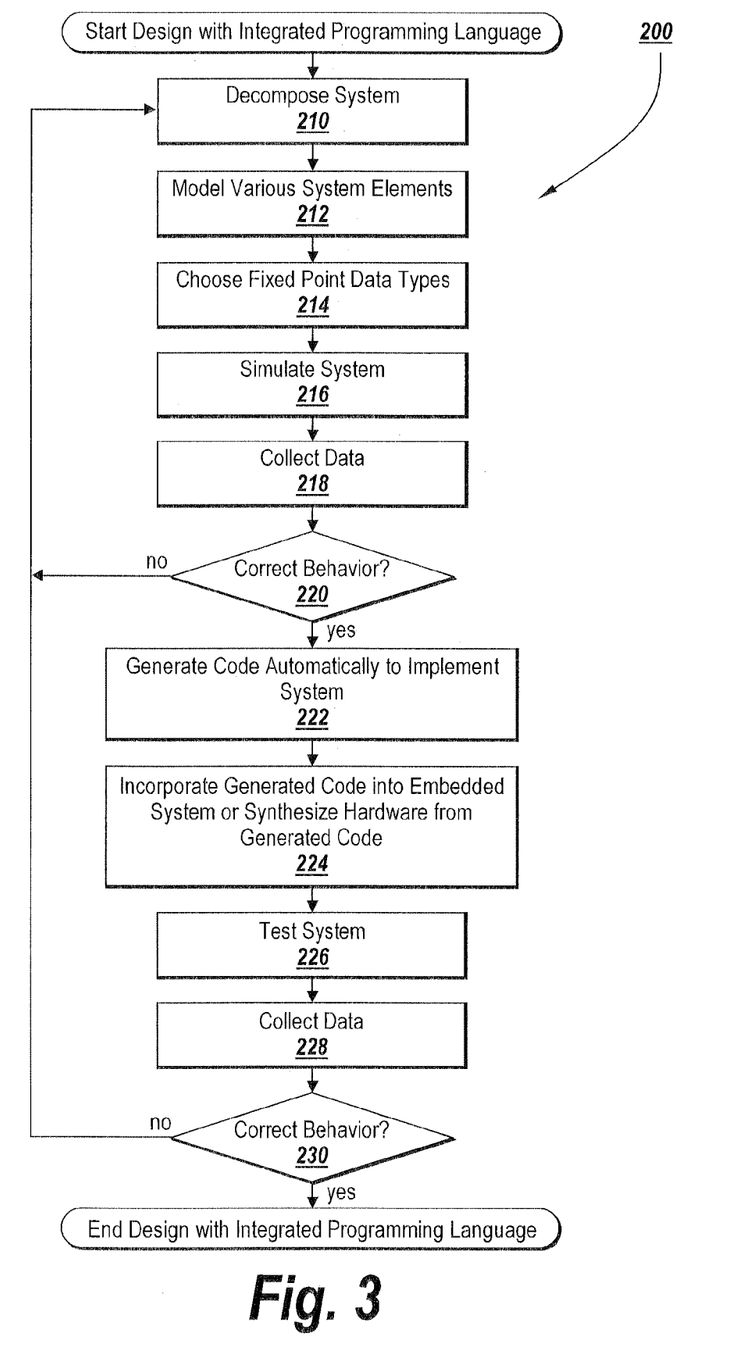
FIG. 3 is a flowchart for a process for using the programming language to model a system.

Referring to FIG. 3, user 28 follows a process 200 to design and implement a design system (not shown) to be modeled using programming language 22. Process 200 decomposes (210) the design system into its elements. These elements include elements to be described with block diagrams, elements to be described with statecharts, and elements to be described with matrix language programs. Process 200 models (212) the various elements by drawing the block diagrams, drawing the statecharts, and writing matrix language programs. Database 17 stores the block diagrams, statecharts, and matrix language generated by user 28.

Process 200 chooses (214) appropriate fixed-point data types 32. Process 200 simulates (216) the system thus far.

Process 200 collects (218) data using automatic data collection functionality 39.

Process 200 determines (220) if a behavior is correct. If the behavior of the system is not correct, process 200 reiterates 210, 212, 214, 216 and 218 until the errors are corrected.

After the system has the appropriate modeled behavior, process 200 automatically generates (222) computer instructions to implement the modeled system. Process 200 implements (224) the modeled system by incorporating the generated computer instructions into a system with an embedded processor or by synthesizing hardware from the computer instructions.

Process 200 tests (226) the system. Process 200 collects (228) the data using automatic data collection functionality 39. Process 200 determines (230) if the behavior is correct. If the behavior of the system is not correct, process 200 reiterates 210, 212, 214, 216, 218, 220, 222, 224, 226 and 228 until the errors are corrected.

In other examples, the correct behavior of the system is initially determined by simulating with double precision floating point arithmetic instead of fixed-point arithmetic. Once a behavior is determined to be correct, then fixed-point data types 32 are substituted and the behavior of the design system is determined again.

Programming language 22 is not limited to use with the hardware and software of FIG. 1; it can find applicability in any computing or processing environment and with any type of machine that is capable of running a computer program. Programming language 22 can be implemented in hardware, software, firmware or any combination of the three. For example, programming language 22 can be implemented in a circuit that includes one or a combination of a processor, a memory, programmable logic and logic gates. Programming language 22 can be implemented in computer programs executed on programmable computers/machines that each includes a processor, a storage medium or other article of manufacture that is readable by the processor (including volatile and non-volatile memory and/or storage elements), at least one input device, and one or more output devices. Program code can be applied to data entered using an input device to perform programming language 22 and to generate output information.

Each such program can be implemented in a high level procedural or object-oriented programming language to communicate with a computer system. However, the programs can be implemented in assembly or machine language. The language can be a compiled or an interpreted language. Each computer program can be stored on a storage medium or device (e.g., CD-ROM, hard disk, or magnetic diskette) that is readable by a general or special purpose programmable computer for configuring and operating the computer when the storage medium or device is read by the computer to perform programming language 22. Programming language 22 can also be implemented as a machine-readable storage medium, configured with a computer program, where upon execution, instructions in the computer program cause the computer to operate in accordance with programming language 22.

Process 200 is not limited to the specific examples described herein. For example, process 200 is not limited to the specific processing order of FIG. 3. Rather, the blocks of FIG. 3 can be re-ordered, as necessary, to achieve the results set forth above.

In other examples, the programming language does not include block diagram functionality nor statechart functionality. In these examples, programming language supports fixed-point arithmetic through fixed-point data types. In addition, code is generated automatically.

In still another example, programming language does not include block diagram functionality, statechart functionality nor fixed-point data types. In this example, code is generated automatically for an embedded system.

A number of embodiments of the invention have been described. Nevertheless, it will be understood that various modifications can be made without departing from the spirit and scope of the invention. Accordingly, other embodiments are within the scope of the following claims.

What is claimed is:

1. A computer-implemented method comprising:
generating a model implemented in one of a block diagram programming environment or a statechart programming environment, the model having a special matrix language block, a functionality of the special matrix language block being implemented at least in part by a matrix language program written in a first programming language by a user;
automatically generating code for the special matrix language block in a second programming language from the first programming language without requiring the user to provide instructions in the second programming language for the special matrix language block and without requiring the user to provide instructions on how to generate code in the second programming language for the special matrix language block, the second programming language being a high-level programming language;
generating code in the second programming language for the model, the code for the model including the code generated in the second programming language for the special matrix language block; and
storing the generated code in the second programming language for the model in a storage device or a memory.

2. The method of claim 1 wherein the block diagram programming environment or the statechart programming environment supports fixed-point arithmetic.

3. The method of claim 2 further comprising enabling the user to specify a scaling of fixed-point operations in the block diagram programming environment or the statechart programming environment.

4. The method of claim 1, wherein the model uses a statechart representation provided by the statechart programming environment, and a block diagram representation provided by the block diagram programming environment, wherein generating code further comprises:

translating the matrix language program instructions, the block diagram representation, and the statechart representation into a common representation; and generating the code in the second programming language from the common representation.

5. The method of claim 1 wherein automatically generating code further comprises generating code in the second programming language for an embedded processor.

6. The method of claim 1 wherein automatically generating code further comprises generating code in the second programming language for synthesizing hardware.

7. The method of claim 1 wherein the first programming language supports one or more matrix data types and one or more matrix operations as first class language features.

8. The method of claim 7 wherein the matrix operations are selected from a group consisting of matrix multiplication, matrix transposition, matrix complex conjugate transposition, matrix power, matrix right division, matrix left division, matrix factorization, matrix decomposition, and matrix inversion.

9. The method of claim 1 wherein the model is a block diagram model.

10. The method of claim 1 wherein the model is a statechart model.

11. An article comprising a machine-readable medium that stores executable instructions, the instructions causing a machine to:

generate a model implemented in one of a block diagram programming environment or a statechart programming environment, the model having a special matrix language block, a functionality of the special matrix language block being implemented at least in part by a matrix language program written in a first programming language by a user;

automatically generate code for the special matrix language block in a second programming language from the first programming language without requiring the user to provide instructions in the second programming language for the special matrix language block and without requiring the user to provide instructions on how to generate code in the second programming language for the special matrix language block, the second programming language being a high-level programming language;

generate code in the second programming language for the model, the code for the model including the code generated in the second programming language for the special matrix language block; and store the generated code in the second programming language for the model in a storage device or a memory.

12. The article of claim 11 wherein the block diagram programming environment or the statechart programming environment supports fixed-point arithmetic.

13. The article of claim 12 further storing instructions for causing the machine to enable the user to specify scaling of fixed-point operations in the block diagram programming environment or the statechart programming environment.

14. The article of claim 11, wherein the model uses a statechart representation provided by the statechart programming environment, and a block diagram representation provided by the block diagram programming environment, and wherein the instructions for causing the machine to generate computer instructions cause the machine to:

translate the matrix language program instructions, the block diagram representation, and the statechart representation into a common representation; and generate the code in the second programming language from the common representation.

15. The article of claim 11 wherein the instructions causing the machine to automatically generate code further include instructions to cause the machine to generate code in the second programming language for an embedded processor.

16. The article of claim 11 wherein the instructions causing the machine to automatically generate code further include instructions to cause the machine to generate code in the second programming language for synthesizing hardware.

17. The article of claim 11 wherein the first programming language supports matrix data types and matrix operations as first class language features.

18. The article of claim 17 wherein the matrix operations are selected from a group consisting of matrix multiplication, matrix transposition, matrix complex conjugate transposition, matrix power, matrix right division, matrix left division, matrix factorization, matrix decomposition, and matrix inversion.

19. The article of claim 11 wherein the model is a block diagram model.

20. The article of claim 11 wherein the model is a statechart model.

21. An apparatus comprising:

a memory; and a processor configured to:

generate a model implemented in one of a block diagram programming environment or a statechart programming environment, the model having a special matrix language block, a functionality of the special matrix language block being implemented at least in part by a matrix language program written in a first programming language by a user, automatically generate code for the special matrix language block in a second programming language from the first programming language without requiring the user to provide instructions in the second programming language for the special matrix language block and without requiring the user to provide instructions on how to generate code in the second programming language for the special matrix language block, the second programming language being a high-level programming language, generate code in the second programming language for the model, the code for the model including the code generated in the second programming language for the special matrix language block, and store the generated code in the second programming language for the model in a storage device or a memory.

22. The apparatus of claim 21 wherein the block diagram programming environment or the statechart programming environment supports fixed-point arithmetic.

23. The apparatus of claim 22, wherein the processor is further configured to enable the user to specify scaling of fixed-point operations in the block diagram programming environment or the statechart programming environment.

24. The apparatus of claim 21, wherein the model uses a statechart representation provided by the statechart programming environment, and a block diagram representation provided by the block diagram programming environment, and wherein the processor is further configured to:

translate the matrix language program instructions, the block diagram representation, and the statechart representation into a common representation; and generate the code in the second programming language from the common representation.

25. The apparatus of claim 21 wherein the processor is further configured to generate code in the second programming language for an embedded processor.

26. The apparatus of claim 21 wherein the processor is further configured to generate code in the second programming language for synthesizing hardware.

27. The apparatus of claim 21 wherein the first programming language supports matrix data types and matrix operations as first class language features.

28. The apparatus of claim 27 wherein the matrix operations are selected from a group consisting of matrix multiplication, matrix transposition, matrix complex conjugate transposition, matrix power, matrix right division, matrix left division, matrix factorization, matrix decomposition, and matrix inversion.

29. The apparatus of claim 21 wherein the model is a block diagram model.

30. The apparatus of claim 21 wherein the model is a statechart model.

31. The method of claim 1, further comprising:
using the model to generate code for an embedded system from a matrix language programming environment.

32. The method of claim 31 further comprising supporting fixed-point arithmetic in the matrix language programming environment.

33. The method of claim 32 further comprising enabling the user to specify a scaling of fixed-point operations in the matrix language programming environment.

34. The article of claim 11, further storing instructions causing the machine to:
use the model to generate computer instructions for an embedded system from a matrix language programming environment.

35. The article of claim 34 further storing instructions causing the machine to support fixed-point arithmetic in the matrix language programming environment.

36. The article of claim 35 further storing instructions causing the machine to enable the user to specify scaling of fixed-point operations in the matrix language programming environment.

37. The apparatus of claim 21, wherein the processor is further configured to:
use the model to generate code for an embedded system from a matrix language programming environment.

38. The apparatus of claim 37, wherein the processor is further configured to:
support fixed-point arithmetic in the matrix language programming environment.

39. The apparatus of claim 38, wherein the processor is further configured to:
enable a user to specify scaling of fixed-point operations in the matrix language programming environment.

40. The method of claim 1 further comprising collecting data automatically on a behavior of a system modeled with the block diagram programming environment or the statechart programming environment.

41. The method of claim 40 wherein the automatically collected data comprises collected data on values of variables.

42. The method of claim 40 wherein the automatically collected data comprises collected data on values of signals.

43. The method of claim 40 wherein the automatically collected data is selected from a group consisting of minimum and maximum values, statistical distribution of values, the sequence of values, configuration of states, testing of transitions, execution of transitions, states entered, states exited, transitions tested, transitions executed, a sequence of entering states, a sequence of exiting states, a sequence of testing transitions, a sequence of executing transitions, Boolean expressions satisfying condition coverage, and Boolean expressions satisfying modified condition decision coverage.

44. The method of claim 40 wherein collecting data comprises collecting data during simulation of the modeled system.

45. The method of claim 40 wherein collecting data comprises collecting data during execution of instrumented code in an embedded system.

46. The method of claim 40 wherein collecting data comprises collecting data during operation of instrumented hardware.

47. The method of claim 40 further comprising using the automatically collected data for selecting data types.

48. The method of claim 47 wherein the selected data types comprise fixed-point data types.

49. The method of claim 47 wherein the data types are selected automatically in a single user action.

50. The method of claim 40 further comprising using the automatically collected data to measure a completeness of testing.

51. The method of claim 50 wherein to measure completeness comprises determining components executed and determining components not executed.

52. The method of claim 50 wherein to measure completeness comprises determining states entered, states exited, transitions tested, and transitions executed.

53. The method of claim 50 wherein to measure completeness comprises determining values taken by variables and determining values taken by signals.

54. The method of claim 50 wherein to measure completeness comprises determining Boolean expressions satisfying condition coverage and determining Boolean expressions satisfying modified condition decision coverage.

55. The method of claim 40 further comprising using the automatically collected data for verifying the functional behavior of the modeled system.

56. The method of claim 55 wherein verifying functional behavior comprises verifying values.

57. The method of claim 55 wherein verifying functional behavior includes verifying minimum and maximum values.

58. The method of claim 55 wherein verifying functional behavior comprises verifying a statistical distribution of values.

59. The method of claim 55 wherein verifying functional behavior comprises verifying a sequence of values.

60. The method of claim 55 wherein verifying functional behavior comprises verifying a configuration of states, testing of transitions, and execution of transitions.

61. The method of claim 55 wherein verifying functional behavior comprises verifying states entered, verifying states exited, verifying transitions tested, and verifying transitions executed.

62. The method of claim 55 wherein verifying functional behavior comprises verifying a sequence of entering states, verifying a sequence of exiting states, verifying a sequence of testing transitions, and verifying a sequence of executing transitions.

63. The method of claim 40 further comprising using the automatically collected data to optimize the modeled system.

64. The method of claim 63 wherein to optimize the modeled system comprises removing zero checks for division, removing negative checks for square root calculations, removing range checks for array indexing, removing overflow and underflow checks, removing absolute value calculations, and simplifying absolute value computations.

65. The article of claim 11 further storing instructions causing the machine to collect data automatically on a behavior of a system modeled with the block diagram programming environment or the statechart programming environment.

66. The article of claim 65 wherein the automatically collected data comprises collected data on values of variables.

67. The article of claim 65 wherein the automatically collected data comprises collected data on values of signals.

68. The article of claim 65 wherein the automatically collected data is selected from a group consisting of minimum and maximum values, statistical distribution of values, the sequence of values, configuration of states, testing of transitions, execution of transitions, states entered, states exited, transitions tested, transitions executed, a sequence of entering states, a sequence of exiting states, a sequence of testing transitions, a sequence of executing transitions, Boolean expressions satisfying condition coverage, and Boolean expressions satisfying modified condition decision coverage.

69. The article of claim 65 further storing instructions causing a machine to collect data during simulation of the modeled system.

70. The article of claim 65 further storing instructions causing a machine to collect data during execution of instrumented code in an embedded system.

71. The article of claim 65 further storing instructions causing a machine to collect data during operation of instrumented hardware.

72. The article of claim 65 further storing instructions causing a machine to use the collected data for selecting data types.

73. The article of claim 72 wherein the selected data types comprise fixed-point data types.

74. The article of claim 72 wherein the data types are selected automatically in a single user action.

75. The article of claim 65 further storing instructions causing a machine to use the collected data to measure a completeness of testing.

76. The article of claim 75 wherein to measure completeness comprises determining components executed and determining components not executed.

77. The article of claim 75 wherein to measure completeness comprises determining states entered, states exited, transitions tested, and transitions executed.

78. The article of claim 75 wherein to measure completeness comprises determining values taken by variables and determining values taken by signals.

79. The article of claim 75 wherein to measure completeness comprises determining Boolean expressions satisfying condition coverage and determining Boolean expressions satisfying modified condition decision coverage.

80. The article of claim 65 further storing instructions causing a machine to use the collected data for verifying the functional behavior of the modeled system.

81. The article of claim 80 wherein verifying functional behavior comprises verifying values.

82. The article of claim 80 wherein verifying functional behavior includes verifying minimum and maximum values.

83. The article of claim 80 wherein verifying functional behavior comprises verifying a statistical distribution of values.

84. The article of claim 80 wherein verifying functional behavior comprises verifying a sequence of values.

85. The article of claim 80 wherein verifying functional behavior comprises verifying a configuration of states, testing of transitions, and execution of transitions.

86. The article of claim 80 wherein verifying functional behavior comprises verifying states entered, verifying states exited, verifying transitions tested, and verifying transitions executed.

87. The article of claim 80 wherein verifying functional behavior comprises verifying a sequence of entering states, verifying a sequence of exiting states, verifying a sequence of testing transitions, and verifying a sequence of executing transitions.

88. The article of claim 65 further comprising instructions causing the machine to use the collected data to optimize the modeled system.

89. The article of claim 88 wherein to optimize the modeled system comprises removing zero checks for division, removing negative checks for square root calculations, removing range checks for array indexing, removing overflow and underflow checks, removing absolute value calculations, and simplifying absolute value computations.

90. The apparatus of claim 21, wherein the processor is further configured to collect data automatically on a behavior of a system modeled with the block diagram programming environment or the statechart programming environment.

91. The apparatus of claim 90 wherein the automatically collected data comprises collected data on values of variables.

92. The apparatus of claim 90 wherein the automatically collected data comprises collected data on values of signals.

93. The apparatus of claim 90 wherein the automatically collected data is selected from a group consisting of minimum and maximum values, statistical distribution of values, the sequence of values, configuration of states, testing of transitions, execution of transitions, states entered, states exited, transitions tested, transitions executed, a sequence of entering states, a sequence of exiting states, a sequence of testing transitions, a sequence of executing transitions, Boolean expressions satisfying condition coverage, and Boolean expressions satisfying modified condition decision coverage.

94. The apparatus of claim 90, wherein the processor is further configured to collect data during simulation of the modeled system.

95. The apparatus of claim 90, wherein the processor is further configured to collect data during execution of instrumented code in an embedded system.

96. The apparatus of claim 90, wherein the processor is further configured to collect data during operation of instrumented hardware.

97. The apparatus of claim 90, wherein the processor is further configured to use the collected data for selecting data types.

98. The apparatus of claim 97 wherein the selected data types comprise fixed-point data types.

99. The apparatus of claim 97 wherein the data types are selected automatically in a single user action.

100. The apparatus of claim 90, wherein the processor is further configured to use the collected data to measure the completeness of testing.

101. The apparatus of claim 100 wherein to measure completeness comprises determining components executed and determining components not executed.

102. The apparatus of claim 100 wherein to measure completeness comprises determining states entered, states exited, transitions tested, and transitions executed.

103. The apparatus of claim 100 wherein to measure completeness comprises determining values taken by variables and determining values taken by signals.

104. The apparatus of claim 100 wherein to measure completeness comprises determining Boolean expressions satisfying condition coverage and determining Boolean expressions satisfying modified condition decision coverage.

105. The apparatus of claim 90, wherein the processor is configured to use the collected data for verifying the functional behavior of a modeled system.

106. The apparatus of claim 105 wherein verifying functional behavior comprises verifying values.

107. The apparatus of claim 105 wherein verifying functional behavior includes verifying minimum and maximum values.

108. The apparatus of claim 105 wherein verifying functional behavior comprises verifying a statistical distribution of values.

109. The apparatus of claim 105 wherein verifying functional behavior comprises verifying a sequence of values.

110. The apparatus of claim 105 wherein verifying functional behavior comprises verifying a configuration of states, testing of transitions, and execution of transitions.

111. The apparatus of claim 105 wherein verifying functional behavior comprises verifying states entered, verifying states exited, verifying transitions tested, and verifying transitions executed.

112. The apparatus of claim 105 wherein verifying functional behavior comprises verifying a sequence of entering states, verifying a sequence of exiting states, verifying a sequence of testing transitions, and verifying a sequence of executing transitions.

113. The apparatus of claim 90, wherein the processor is configured to use the collected data to optimize the modeled system.

114. The apparatus of claim 113 wherein to optimize the modeled system comprises removing zero checks for division, removing negative checks for square root calculations, removing range checks for array indexing, removing overflow and underflow checks, removing absolute value calculations, and simplifying absolute value computations.

\* \* \* \* \*

UNITED STATES PATENT AND TRADEMARK OFFICE
CERTIFICATE OF CORRECTION

| | |
|---|---|
| PATENT NO. | : 7,885,792 B2 |
| APPLICATION NO. | : 10/414260 |
| DATED | : February 8, 2011 |
| INVENTOR(S) | : Charles J. Devane |

Page 1 of 1

It is certified that error appears in the above-identified patent and that said Letters Patent is hereby corrected as shown below:

On the Cover Page:

Please add Related U. S. Data Applications as follows -- This application relates to U.S. Serial No. 10/414,250, filed 04/15/03, now Patent No. 7,523,443, issued 04/21/09 --

Under References Cited, Other Publications, please delete the following duplicate reference "The Mathworks Inc., "Simulink: Dynamic System Simulation for Matlab" Ver. 3, 1999, 55 pgs."

Signed and Sealed this
Tenth Day of April, 2012

David J. Kappos
*Director of the United States Patent and Trademark Office*